US008428583B2

(12) United States Patent
Ruhanen et al.

(10) Patent No.: US 8,428,583 B2
(45) Date of Patent: Apr. 23, 2013

(54) MANAGING SUBSCRIBER INFORMATION

(75) Inventors: Mikko Ruhanen, Tampere (FI); Kari Silfverberg, Mouhijarvi (FI); Tom Grahn, Vantaa (FI); Miikka Huomo, Vantaa (FI); Auvo Hartikainen, Tampere (FI)

(73) Assignee: Nokia Corporation, Espoo (FI)

(*) Notice: Subject to any disclaimer, the term of this patent is extended or adjusted under 35 U.S.C. 154(b) by 912 days.

(21) Appl. No.: 11/642,549

(22) Filed: Dec. 21, 2006

(65) Prior Publication Data

US 2008/0153488 A1   Jun. 26, 2008

(51) Int. Cl.
    H04W 4/00       (2009.01)
(52) U.S. Cl.
    USPC ............. 455/432.2; 455/433; 455/435.1; 455/407; 455/411; 455/552.1
(58) Field of Classification Search .... 455/432.1–435.3, 455/552.1, 553.1, 405–411
    See application file for complete search history.

(56) References Cited

U.S. PATENT DOCUMENTS

| | | | | |
|---|---|---|---|---|
| 5,265,155 A * | 11/1993 | Castro | 379/114.2 |
| 6,816,720 B2 * | 11/2004 | Hussain et al. | 455/404.2 |
| 7,171,199 B1 * | 1/2007 | Rahman | 455/433 |
| 7,224,960 B2 * | 5/2007 | Giacalone et al. | 455/410 |
| 7,287,062 B2 * | 10/2007 | Im et al. | 709/213 |
| 7,369,850 B2 * | 5/2008 | Andrew et al. | 455/435.1 |
| 7,379,737 B2 * | 5/2008 | Kwan et al. | 455/432.2 |
| 7,983,712 B2 * | 7/2011 | Mayer et al. | 455/553.1 |
| 8,010,150 B2 * | 8/2011 | Magnusson et al. | 455/552.1 |
| 8,290,487 B2 * | 10/2012 | Muratore et al. | 455/433 |
| 2001/0029174 A1 * | 10/2001 | Herajarvi et al. | 455/406 |
| 2002/0037731 A1 * | 3/2002 | Mao et al. | 455/453 |
| 2002/0095312 A1 * | 7/2002 | Wheat | 705/1 |
| 2003/0008649 A1 * | 1/2003 | Larson | 455/424 |
| 2003/0032409 A1 * | 2/2003 | Hutcheson et al. | 455/414 |
| 2003/0074286 A1 * | 4/2003 | Rodrigo | 705/32 |
| 2003/0083065 A1 * | 5/2003 | Eales et al. | 455/433 |
| 2003/0143978 A1 * | 7/2003 | Cooper et al. | 455/406 |
| 2004/0125755 A1 * | 7/2004 | Roberts | 370/259 |
| 2004/0163029 A1 * | 8/2004 | Foley et al. | 714/769 |
| 2005/0037787 A1 * | 2/2005 | Bachner et al. | 455/502 |
| 2005/0272465 A1 * | 12/2005 | Ahmavaara et al. | 455/552.1 |
| 2006/0004643 A1 * | 1/2006 | Stadelmann et al. | 705/34 |
| 2006/0133340 A1 * | 6/2006 | Rybak et al. | 370/338 |
| 2007/0011298 A1 * | 1/2007 | Givoly et al. | 709/223 |
| 2007/0072605 A1 * | 3/2007 | Poczo | 455/432.2 |
| 2007/0100981 A1 * | 5/2007 | Adamczyk et al. | 709/223 |
| 2007/0118558 A1 * | 5/2007 | Kahandaliyanage | 707/104.1 |
| 2007/0186001 A1 * | 8/2007 | Wayda et al. | 709/230 |
| 2007/0220005 A1 * | 9/2007 | Castro Castro et al. | 707/9 |
| 2008/0014904 A1 * | 1/2008 | Crimi et al. | 455/406 |
| 2008/0146201 A1 * | 6/2008 | O'Neill et al. | 455/414.1 |
| 2008/0197992 A1 * | 8/2008 | Murray et al. | 340/441 |
| 2008/0200176 A1 * | 8/2008 | Hutcheson et al. | 455/446 |
| 2009/0313503 A1 * | 12/2009 | Atluri et al. | 714/19 |
| 2009/0327366 A1 * | 12/2009 | Alexander et al. | 707/204 |
| 2009/0327568 A1 * | 12/2009 | Wayda et al. | 710/306 |
| 2012/0108206 A1 * | 5/2012 | Haggerty | 455/411 |

* cited by examiner

*Primary Examiner* — Sharad Rampuria
(74) *Attorney, Agent, or Firm* — Alston & Bird LLP

(57) ABSTRACT

A method includes storing subscriber data at one or more locations, and storing, at least one of the one or more locations, one or more rules for managing the subscriber data at least one of the one or more locations. The subscriber data regarding at least one of the one or more locations is managed on the basis of the rules.

10 Claims, 7 Drawing Sheets

MANAGING SUBSCRIBER INFORMATION

The present invention relates to techniques for managing information regarding a subscriber to a telecommunications network.

When a user terminal attempts to access a telecommunications network, it is normal practice for the telecommunication network to control access to said telecommunications network on the basis of subscriber information associated with said user terminal. Such subscriber information may, for example, include personal information, charging profile information, and authentication, authorisation and accounting information etc.

A register, such as a Home Location Register, is typically used to store such subscriber data for a plurality of subscribers. In order to reduce the load on such register, it is known to remove from such register subscriber data for any subscriber as and when that subscriber has been inactive for a pre-defined period of time (which operation is known as "cleaning"). There has been identified the problem that such technique for cleaning the register is not as efficient as it could be in a system involving different kinds of users.

Also, where there is the possibility that a subscriber may access the telecommunications network via one of a plurality of different access technologies through a respective application, it is known to provide several stand-alone SQL/LDAP servers to provide user access information for the respective various access technologies. There has been identified the problem that such a system is complex and inefficient in terms of database usage.

Furthermore, the inventors have identified a need to more flexibly control calls/sessions, and in particular to provide a more flexible charging policy which can be tailored to meet the particular requirements of any subscriber with a view to making subscription more attractive to customers. The more flexible management of subscriber profile information, such as for example charging class information, could be done by each service application processing subscriber profile information received from a centralised store of said subscriber profile information, but there has been identified the additional problem that this would make the applications complex and difficult to maintain.

It is an aim of the present invention to provide one or more techniques that at least partly address one or more (but preferably all) of the problems discussed above.

According to the present invention, there is provided a method comprising: storing subscriber data at one or more locations; storing at least one of said one or more locations one or more rules for managing said subscriber data at least one of said one or more locations; and managing said subscriber data at least one of said one or more locations on the basis of said rules.

In one embodiment, the method further comprises: receiving a request for data regarding a first subscriber to a communications network; processing at least one element of said subscriber data for said first subscriber on the basis of at least a first rule of said one or more rules and on the basis of a feature of said request so as to produce a modified element of subscriber data; and providing said modified element of subscriber data to said application. Said at least one element of data may specify at least a first value for a parameter, and said modified element of data specifies at least a second value for said parameter different to said at least a first value. Said feature of said request is, for example, selected from the group consisting of: the time at which the request was made; the identity of an application to which the request relates; and the type of service to which the request relates.

In one embodiment said request is from a charging system, and the parameter is charging class.

In one embodiment, the method comprises: in response to a change in a parameter, providing subscriber information to an application, wherein the subscriber information provided to the application is based on said subscriber data stored at said one or more locations and at least a first rule of said one or more rules for modifying said subscriber data in response to said change in a parameter. Said change in a parameter is, for example, selected from the group consisting of: a change in time and a change in the location of a subscriber.

In one embodiment, the method comprises: controlling retention of said subscriber data for a first subscriber at least a first location of said one or more locations on the basis of at least one first rule of said one or more rules and on the basis of said subscriber data for said first subscriber. Said subscriber data specifies a subscription type for said first subscriber, and said at least one first rule specifies if and when said subscriber data for said first subscriber is to be deleted from said at least first location on the basis of said subscription type for said first subscriber. Said subscription type is, for example, selected from the group consisting of: business user, pre-paid subscriber, telemetric subscriber and low-end user. Said first location may be a Home Location Register (HLR), and the method may comprise deleting said subscriber data for said first subscriber from said HLR but retaining said subscriber data for said first subscriber at a central repository, from where it is automatically restored to the HLR when an application generates a transaction related to said subscriber data for said first subscriber.

Initiating said deleting may be done on the basis of said at least one first rule and subscriber data for said first subscriber stored at said central repository. For example, said at least one first rule may specify deleting said subscriber data for a subscriber of a first type from said Home Location Register immediately after each and every time a transaction relating to said subscriber of a first type is completed.

In one embodiment, said subscriber data for a first subscriber is stored at a Home Location Register (HLR), and said at least one first rule specifies controlling the retention of said subscriber data for a subscriber of a second type at said Home Location Register such that said subscriber data for said subscriber of a second type is not deleted from said Home Location Register regardless of how long since the Home Location Register last received a request for information regarding said subscriber of a second type.

According to the present invention, there is also provided a device, comprising: a first unit configured to store subscriber data; a second unit configured to store one or more rules for managing said subscriber data; and a third unit configured to manage said subscriber data on the basis of said one or more rules.

In one embodiment, the device is configured to: receive a request from an entity for data regarding a first subscriber to a communications network; and wherein said third unit is configured to process at least one element of data from said subscriber data for said first subscriber on the basis of at least one first rule of said one or more rules and on the basis of a feature of said request so as to produce a modified element of data, and to provide said modified element of data to said entity. For example, said request may from a charging system, and the at least one element of data may be charging class.

In one embodiment, the device is configured to: in response to a change in a parameter, provide subscriber information to an application, wherein the subscriber information provided to the application is based on said subscriber data stored at said first unit and at least a first rule of said one or more rules for modifying said subscriber data in response to said change in a parameter. Said change in a parameter is, for example, selected from the group consisting of: a change in time and a change in the location of a subscriber.

In one embodiment said subscriber data is stored at a plurality of said first units, and wherein said third unit is configured to control retention at one of said plurality of said first units of said subscriber data regarding a first subscriber to a telecommunications network on the basis of at least one first rule of said one or more rules and on the basis of said subscriber data for said first subscriber. Said plurality of said first units may, for example, include a Home Location Register and a central subscription repository.

According to the present invention, there is also provided a system comprising: a first entity configured to store subscriber data for a plurality of subscribers to one or more communications network; and a second entity configured to implement a service for at least a first subscriber on the basis of subscriber information received from said first entity for said at least first subscriber; wherein said first entity is also configured to store one or more rules for processing said subscriber data, and to provide to said second entity subscriber information for said at least first subscriber based on said subscriber data for said at least first subscriber and at least a first rule of said one or more rules.

In one embodiment, the first entity is a central subscription repository, and.or the second entity is configured to implement a Charging System application.

According to the present invention, there is also provided a system comprising: a first entity configured to store subscriber data for a plurality of subscribers to a communications network; and a second entity configured to also store subscriber data for said plurality of subscribers; wherein said second entity is configured to control the retention at said first entity of said subscriber data for at least a first subscriber on the basis of at least one first rule of one or more rules stored at said first entity and on the basis of said subscriber data for said first subscriber.

In one embodiment, the second entity is a centralised subscription repository, and/or the first entity is an HLR According to the present invention, there is also provided a computer program product comprising program code which when loaded onto a computer performs the managing of any of the above methods.

According to the present invention, there is also provided a device, comprising: means for storing subscriber data; means for storing one or more rules for managing said subscriber data; and means for managing said subscriber data on the basis of said one or more rules.

According to the present invention, there is also provided a method comprising: providing at a single logical entity a source of subscriber information relating to controlling access to a network via each of a plurality of wireless access technologies.

In one embodiment, the method comprises obtaining from said single logical entity subscriber information relating to controlling access to a network via a first access technology; and obtaining from said single logical entity subscriber information relating to controlling access to a network via a second access technology different to said first access technology. The single logical entity may, for example, function as a Home Location Register. Said subscriber information may, for example, include authentication, authorisation and accounting information.

According to the present invention, there is also provided a device which is configured to store subscriber information relating to controlling access to a network via each of a plurality of access technologies; and upon request to provide selected data from said stored information to an application for implementing a service relating to one of said plurality of access technologies.

In one embodiment, the device functions as a Home Location Register, and/or said subscriber information includes authentication, authorisation and accounting information.

According to the present invention, there is also provided a device which is configured to participate in controlling access by a subscriber to a network for both access via a first access technology and access via a second access technology, and to access a single logical entity for subscriber information relating to control of said access regardless of whether the access is via said first access technology or via said second access technology.

In one embodiment, the device is located at a Serving GPRS Support Node (SGSN), and/or the single logical entity is a Home Location Register.

Embodiments of the present invention are described in more detail hereunder, by way of example only, with reference to the accompanying drawings, in which.

Figure 1:
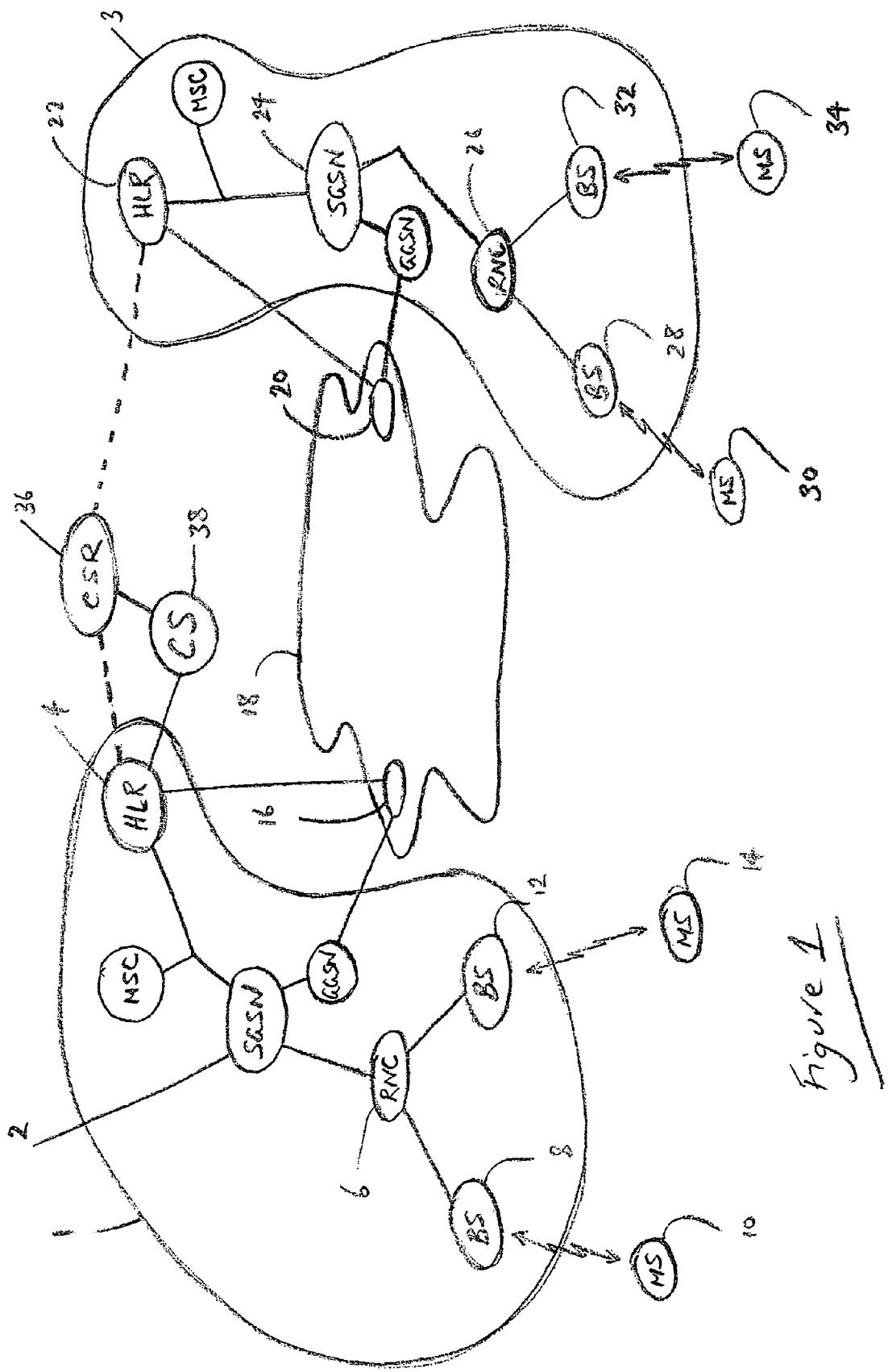
FIG. 1 shows an example of a system architecture to which the present invention is applicable.

With reference to FIG. 1, a mobile station 10 may attempt to access a first mobile network 1. The mobile station 10 may, for example, wish to conduct a call with another mobile station associated with the same mobile network 1 or with another mobile network, or to obtain information from a remote server accessible via the mobile network and one or more other networks such as the internet or Public Switched Telephone Network (PSTN). The mobile station 10 sends signalling to a GPRS Support Node (SGSN) 2 via a base station 8 and a Radio Network Controller (RNC) 6. The signalling includes a request for a particular service (such as a call to a remote party) and includes information identifying the mobile station 10.

One or more applications are typically used for implementing the requested service. The one or more Applications typically require subscriber information in order to implement the service. For example, a Charging System application 38 may need to be provided with charging class information from the subscriber profile.

Information relating to subscribers, such as access, authorisation and accounting (AAA) information etc., may be stored at a centralised subscription repository (CSR) (36). The central subscription repository (CSR) 36, is (i) accessible by control entities of a plurality of access networks, and/or (ii) holds subscriber data for a plurality of different applications, including those normally serviced by a HLR.

The Charging System application 38 accesses the CSR 36 for the charging class information it requires.

Figure 2:
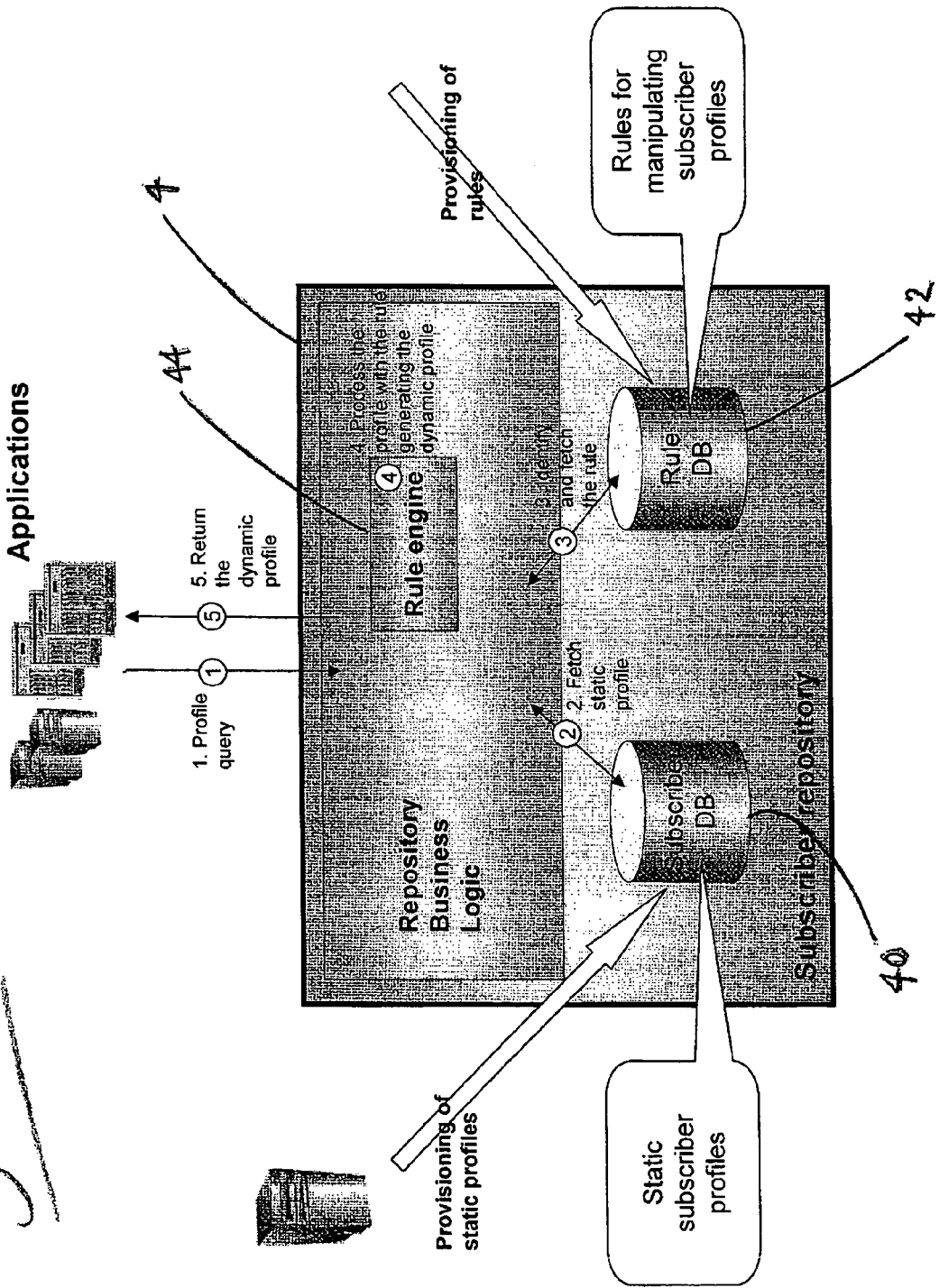
FIG. 2 illustrates an apparatus for storing and providing subscriber information according to an embodiment of the present invention.

FIG. 2 illustrates a device according to an embodiment of the present invention for locating at CSR 36.

The device illustrated in FIG. 2 includes a Subscriber Database 40 storing subscriber profile data, a Rule Database 42 and a Rule Engine 44. At step (1), the CSR 36 receives a request from an application for subscriber profile information associated with the mobile station 10 requesting the service. At step (2), subscriber profile data is fetched from the Subscriber Database 40. At step (3), one or more profile manipulating rules for manipulating said subscriber profile data are fetched from the Rule Database 42. At step (4), the Rule Engine 44 processes the subscriber profile data fetched from the Subscriber Database 40 in accordance with the one or more profile manipulating rules fetched from the Rule Database 42. The functionality of the Rule Engine 44 could be implemented by software.

With reference to the Charging System application 38 mentioned above, there may, for example, be a rule that the operator of mobile network 1 does not make any charge for calls made by the subscriber on his/her birthday. The Rule may take the form "IF birthday THEN Charging Class=Free". The date of the birthday of the subscriber is specified in the subscriber profile data maintained at the Subscriber Database 40. The subscriber profile stored at the Subscriber Database also specifies a default value for the Charging Class. For example, it might be Charging Class=Business. When it is the subscriber's birthday, the rule engine 44 processes the default value according to the above-mentioned rule, and provides the Charging System Application 38 with the information that the Charging Class=Free. When another rule applies to the charging class, the rule engine 44 again processes the default value accordingly, and provides the application with the processed value for the Charging Class. Where there is no applicable rule relating to the Charging Class, the rule engine 44 provides the Application with the Default Value for the Charging Class.

Figure 4:
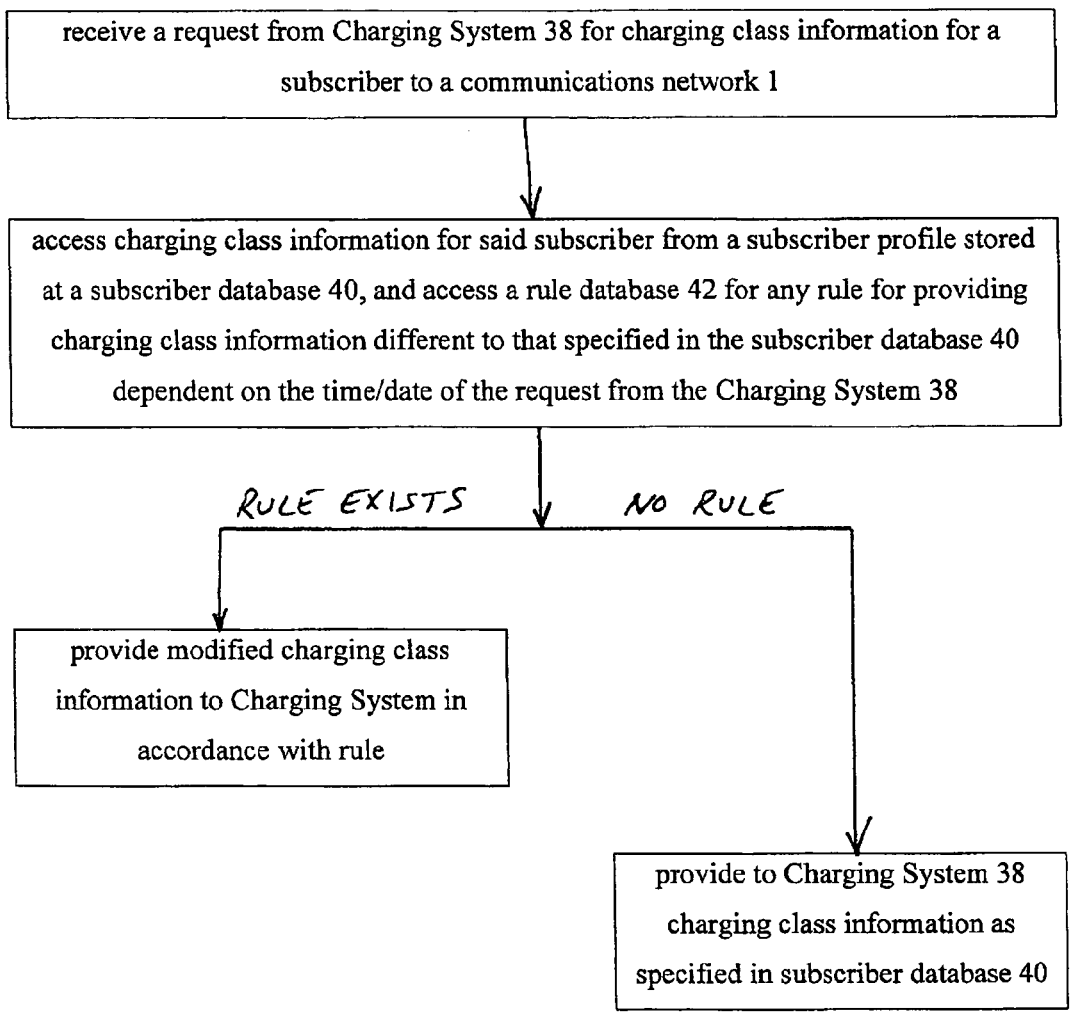
FIG. 4 illustrates an operation of a CSR according to an embodiment of the present invention.

The above-described operation of the device of FIG. 2 for the Charging System application 38 example is illustrated in FIG. 4.

There could, for example, also be other rules that are based on the time/date of the query from an Application to the CSR 36 for the subscriber profile. There could also be one or more rules that are based on the identity of the Application making the query for the subscriber profile, and/or one or more rules that are based on the identity of the service to which the Application making the query for the subscriber profile is related.

In the example described above, the device of FIG. 2 provides subscriber information to the Charging System application 38 in response to a request from the Charging System application. In one variation, the device of FIG. 2 may voluntarily provide subscriber information to an Application even without any such request. For example, the services available to a subscriber at any given time may depend on the location of the subscriber at such time, and there could be a rule that specifies providing modified available service data to an Application in response to a certain change in the present location of the subscriber as specified in the subscriber profile data for said subscriber at subscriber database 40. Similarly, there could be a rule that specifies providing other modified subscriber profile data to an Application based on the time or present location of the subscriber. Such rules could be general rules for all subscribers. For example, for a given area, the available service data sent to the Application could be modified in the same way for any subscriber specified in his/her subscriber profile stored at database 40 to have moved into such area.

In this way, an Application (such as Charging System Application 38) can operate in accordance with any rules that the operator of the wireless access network might wish to apply without any need for the Application to be specially modified, which special modification could make the Application unnecessarily complex and difficult to maintain. In other words, the Application can use the subscriber profile as received from the CSR 36 without having to make complex decisions about how to apply the profile. Also, the maintenance of the subscriber profile data is made simple.

Management functionality is provided to create and maintain the profile manipulation rules.

According to one variation of the above-described technique, the device illustrated in FIG. 2 could instead be located at Home Location Register 4 (and/or Home Location Register 22). If first mobile network 1 is the home network for mobile station 10, the Charging System application 38 would access the Home Location Register 4 associated with the first mobile network for the subscriber information it requires. If, for example, second mobile network 3 is the home network for mobile station 10, the Charging System application 38 would access via the internet 18 the Home Location Register 22 associated with the second mobile network 3 for the subscriber information it requires.

According to an embodiment of another aspect of the present invention, the HLR 4 is configured to be a source of information for service, access, authentication, authorisation and accounting information for calls/sessions based on any one of a plurality of wireless access technologies.

An example of service type information is information as to the closest network element (NE) that provides the user-requested service based on the user/access point location. An example of access information is information as to whether an IP-address can be given for some xDSL line-id. This is closely related to authorisation.

In one example, the SGSN 2 is configured to offer RADIUS server functionality not only for GPRS access (such as access by a GPRS mobile station 10 via a GPRS base station 8) but also for access (by a second type of mobile station 14 via a second type of base station 12) to the network 1 according to one or more of the wireless access technologies listed below, and/or one or more non-wireless technologies.

Broadband Wireless Access (BWA)
Worldwide Interoperability for Microwave Access (WiMax)
Internet—High Speed Packet Access (I-HSPA)
3.9G/LTE (and additionally, the next generation of 3G technologies, 3.9G, also called UTRAN LTE (Universal Terrestrial Radio Access Network Long Term Evolution) or Super 3G. Its peak data rates are targeted to reach up to 100 Mbps in the downlink and 50 Mbps in the uplink.
Any NGN technology (as specified by ETSI TISPAN specifications e.g. ES 282 001, where ETSI is the European Telecommunication Standards Institute and TISPAN is an acronym for TIPHON (Telecommunications and Internet Protocol Harmonization over Networks) and SPAN (Services and Protocols for Advanced Networks).
High Speed Packet Access (HSPA): A nomenclature for developments encompassing both directions of information transmission—the downlink (HSDPA) and the uplink (HSUPA) directions. HSPA is an enhancement to UMTS and offers a successful combination of spectral efficiency (4-5 times that of UMTS), high speed data throughput (eventually averaging 550-1100 Kbps on the downlink), and low latency (less than 100 ms), thus enabling true mass market mobile broadband. HSPA also lowers the cost per bit, enabling cost-effective, rich multimedia services.

HSPA Evolution (HSPA+): HSPA+ is a study item of 3GPP to enable operators to capitalize on existing RAN infrastructure investments by further improving the radio performance of HSPA, as well as leveraging the use of the SAE (see below) core with the current radio interface in 2×5 MHz spectrum. HSPA+ is an enhancement where simplifications and rationalizations agreed upon for LTE/SAE (see below) are partially applied to the HSPA system with a vision of providing full service delivery through the Packet Switched (PS) Domain.

System Architecture Evolution (SAE): The 3GPP work item for developing a framework for a higher-data-rate, lower-latency, packet-optimized system that supports multiple radio access technologies with a focus on the packet-switched domain to support voice services. The main drivers for the network evolution are: to be able to meet the targets for the evolution of the radio-interface (LTE) (see below), to enable evolution towards an All-IP Network, and to support mobility and service continuity between heterogeneous access networks.

Long Term Evolution (LTE): The 3GPP work item on the long term evolution (LTE) of UTRAN (Universal Terrestrial Radio Access Network) or the Air-Interface Evolution to develop a framework for a high-data-rate, low-latency and packet-optimized radio-access technology.

Furthermore this technique also suits Broadband wireline access such as xDSL. In xDSL, access information would be relevant for DHCP purposes.

The data that is stored in the HLR 4 is used by the DHCP/RADIUS server or any other server such as NASS (Network Attachment SubSystem) to validate, authorize, authenticate, grant permission or used for accounting purposes. NASS could use the stored data for resource admission control purposes (RACS as specified by TISPAN) or for TISPAN user profiles that can be used by applications/service layer/service control subsystem. In TISPAN specifications, the HLR would act as PDBF (Profile Database Functions).

Figure 5:
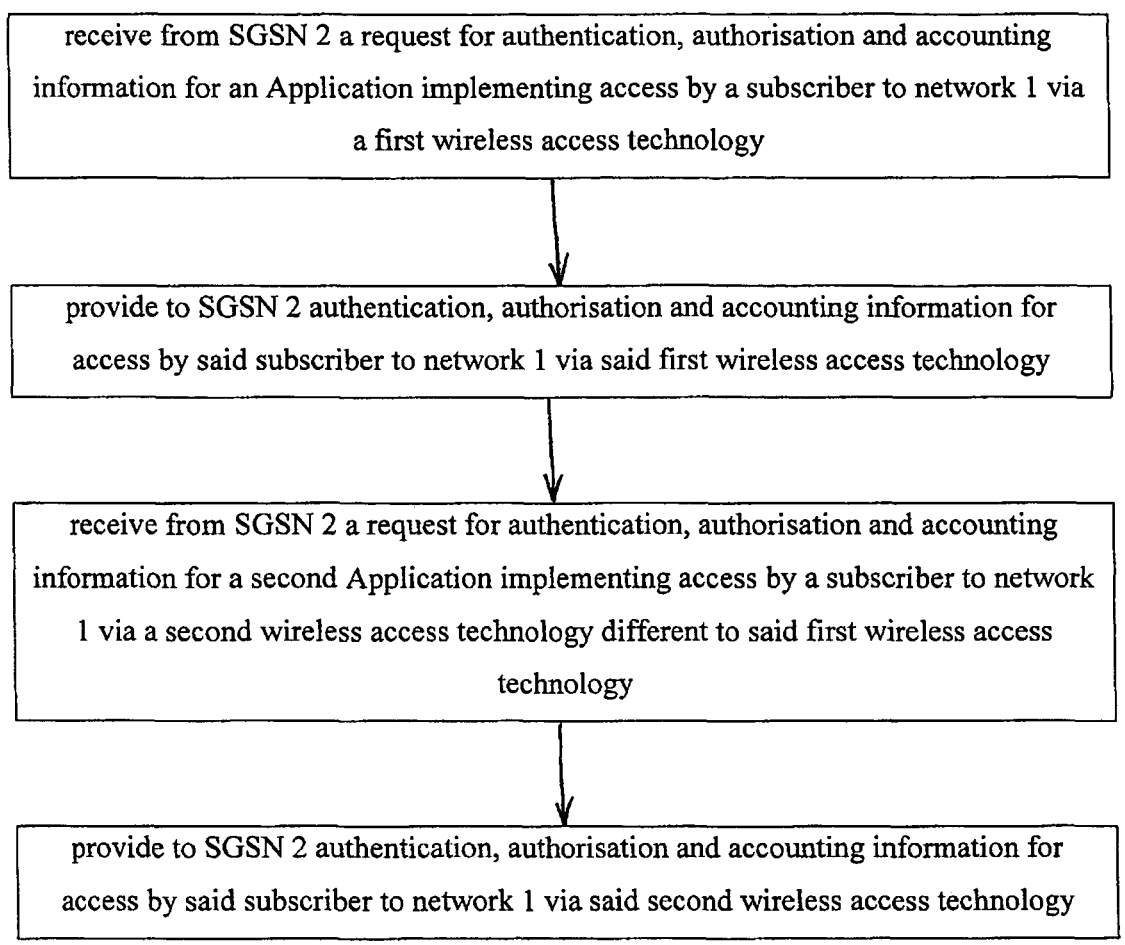
FIG. 5 illustrates an operation of an HLR according to an embodiment of the present invention.
Figure 6:
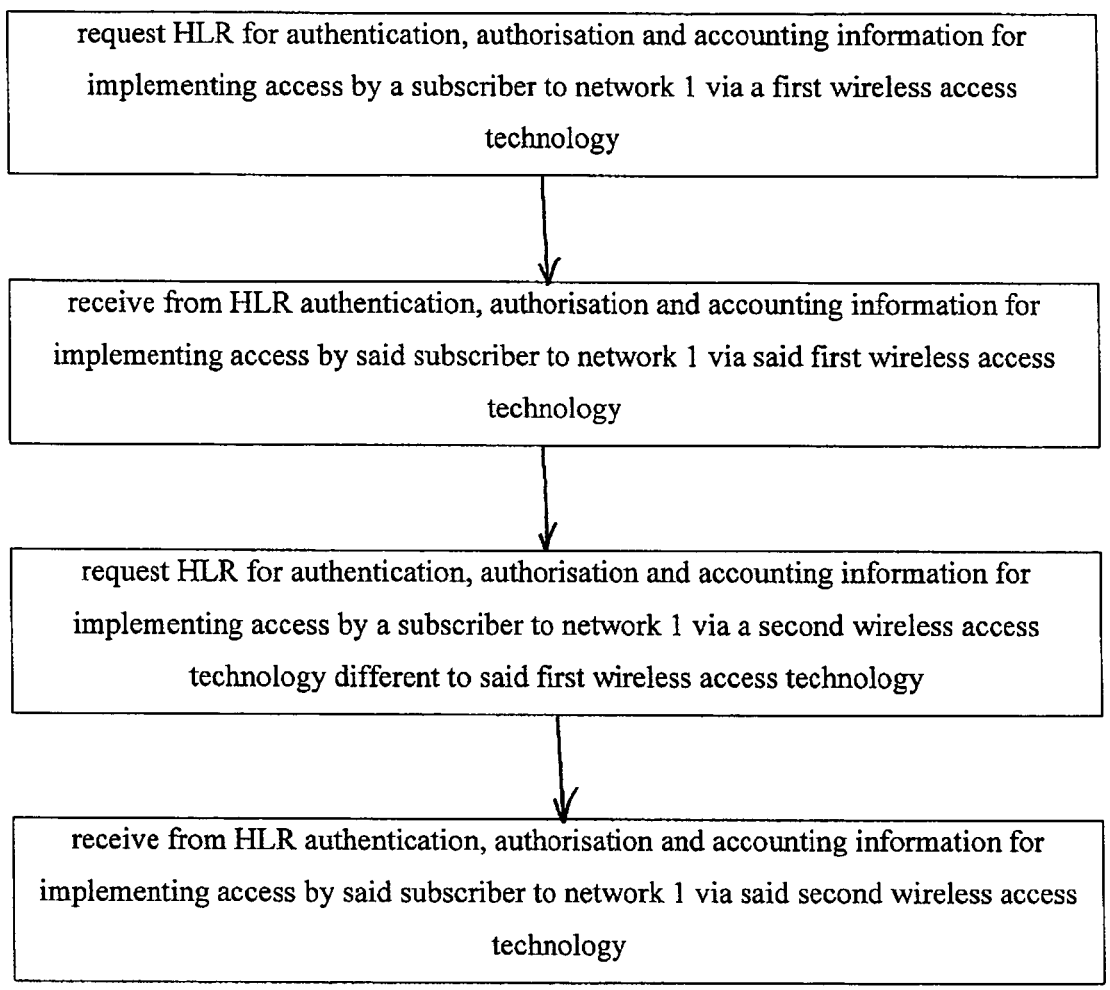
FIG. 6 illustrates an operation of a SGSN according to an embodiment of the present invention.

This operation of the SGSN 2 is illustrated in FIG. 6, and this operation of the HLR 4 is illustrated in FIG. 5.

The DHCP/AAA/NASS functionality could be integrated to the SGSN 2 (or an Internet Service Node (ISN) (or similar node). The above-described integrated technique has the advantage that the SGSN 2 only needs to be able to connect to the HLR 4 to obtain AAA data for any one of a plurality of wireless access technologies, the configuration for setting up other wireless access technologies (such as BWA) is simplified, and database usage is streamlined as all the required information can be accessed from the HLR 4.

In one embodiment, the SGSN with integrated DHCP/AAA/NASS functionality receives all the necessary information from the HLR relating to the particular user. The database (DB) load is thereby significantly decreased. Also this would simplify the SGSN as it would need to support only one interface (i/f) to the database. The interface could, for example, be one that facilitates access to Structured Query Language (SQL)/Lightweight Directory Access Protocol (LDAP) database(s) to obtain such data.

Furthermore, where HLR 4 is used as a source of subscriber profile information, a centralised subscriber data repository (CSR) 36 is also provided in addition to the HLR 4. The subscriber profile data that is stored at the Subscriber Database of the HLR 4 is also stored at the CSR 36. The HLR can thus be cleaned of all data other than that which it is considered efficient to retain at the HLR 4 whilst retaining a separate store of such information at the CSR with which to replenish HLR 4, when necessary (such as when a subscriber becomes newly active after a prolonged period of inactivity).

The decision as to when to clean the HLR 4 of subscriber data for a given subscriber is based on the subscriber type/class specified in the subscriber profile for the subscriber, and rules defined by the network operator. The following are provided as examples:

A. Some subscribers may be classed as business users, and there may be a rule that any business user is never to have his/her subscriber profile automatically cleaned from the HLR regardless of how long he/she may be inactive (i.e. regardless of how much time has passed since the last time the HLR received a request for the subscriber profile for the subscriber).

B. Some subscribers might be classed as pre-paid subscribers and some subscribers might be classed as contract subscribers, and the rules might specify different, respective periods of inactivity after which each of these two types of subscribers are to have their data cleaned from the HLR 4. For example, the rules might specify pre-paid subscribers are to have their data cleaned from the HLR after two weeks of inactivity, but specify a different period of inactivity for contract subscribers.

C. Some subscribers might be classified as telemetric subscribers, and the rules might specify that the subscriber profile associated with such a subscriber is to be automatically cleaned from the HLR immediately after the end of each and every transaction involving such subscriber.

D. An operator might offer different types of subscriptions at different costs. Subscribers having a low-cost might be classed as low-end users, and the rules might specify that the subscriber profile for any such low-end user is to be cleaned from the HLR 4 after a shorter period of inactivity than for other users having a higher cost subscription. For example, the rules might specify that a low-end user is to have his/her data automatically cleaned from the HLR after only one day of inactivity.

Another possibility is to specify on an individual basis how cleaning should be performed. This could be done by including in the subscriber profile stored at the CSR 36 one or more special data fields that explicitly specify if and how automatic cleaning should be performed for the respective subscriber.

In each case where a subscriber profile for a subscriber is automatically cleaned from the HLR 4, said subscriber profile is retained at the CSR 36 and is restored to the HLR the next time a transaction is initiated by said subscriber.

Figure 7:
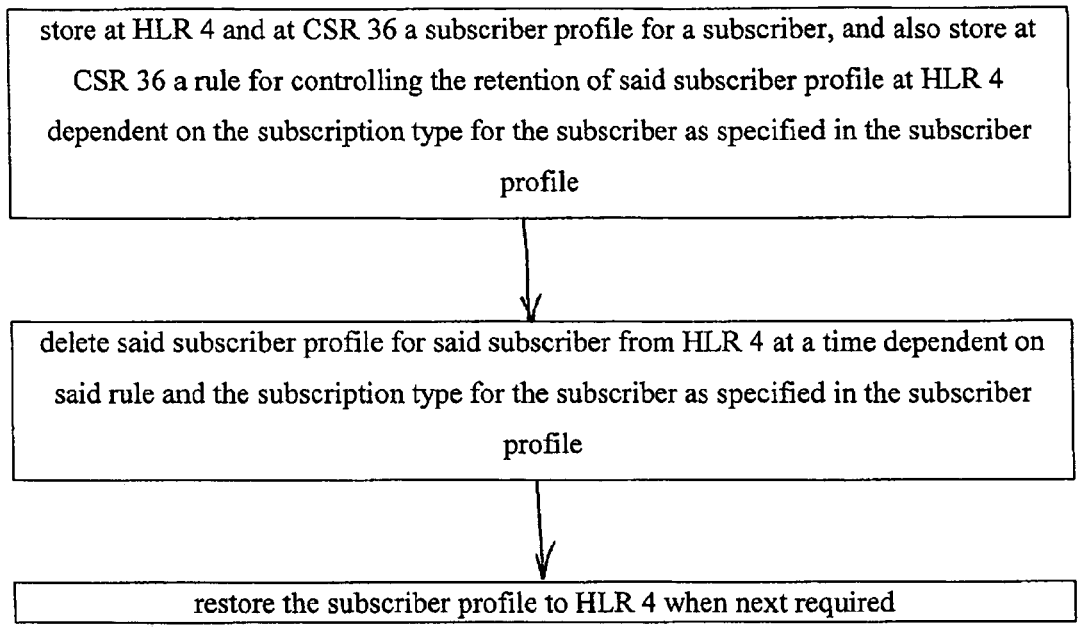
FIG. 7 illustrates a method of controlling the retention of subscriber information at an HLR according to an embodiment of the present invention.

The above-described technique is illustrated in FIG. 7.

Figure 3:
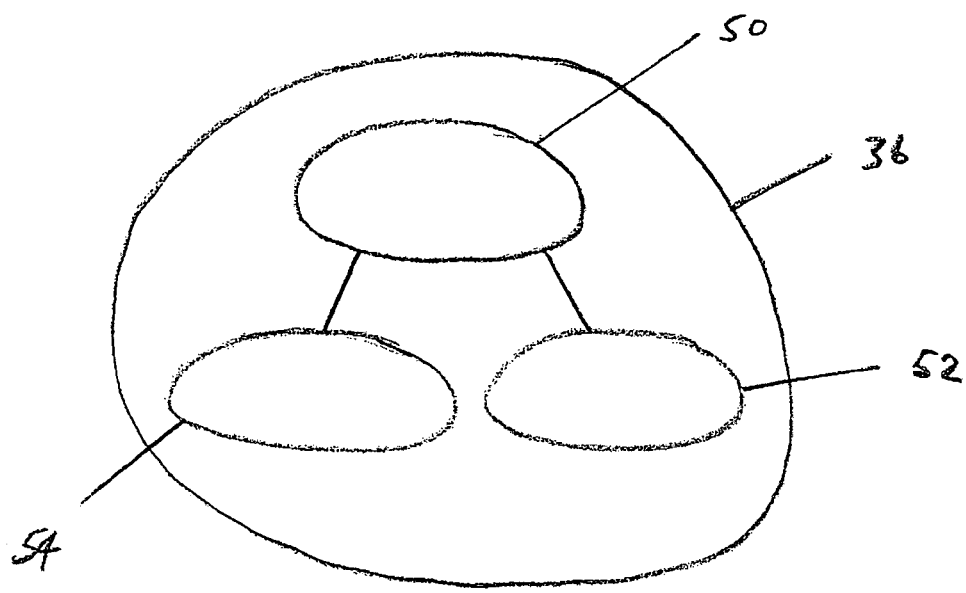
FIG. 3 illustrates an apparatus for controlling the maintenance of subscriber information according to an embodiment of the present invention.

The functionality of the CSR 36 for such a technique is illustrated in more detail in FIG. 3. It includes a subscriber profile database 54 for storing subscriber profile data, a cleaning rule database 52 for storing one or more cleaning rules that can be entered via a user interface (not shown), and a processor 50 for making a decision as to when to clean subscriber profile data from the HLR 4 on the basis of the subscriber profile data, and where applicable, also on the basis of the applicable cleaning rule stored at cleaning rule database 52. For example, where the profile of a given subscriber specifies explicitly (in said one or more above-mentioned special data fields) how cleaning should be performed for said subscriber, the processor 50 controls the automatic cleaning of data from the HLR 4 accordingly. Where there is no such explicit information included in the profile of a subscriber, the processor 50 controls the automatic cleaning of data from the HLR 4 on the basis of the subscriber class specified for the subscriber in the subscriber profile and on the basis of the cleaning rule specified for such class in the cleaning rule database 52. This functionality of the CSR could be implemented by software.

The dotted line between the CSR 36 and the HLR 4 in FIG. 1 indicates the logical connection between the CSR 36 and the HLR 4. The CSR may store subscriber profile data for more than one access network. For example, with reference to FIG. 1, the CSR 36 may also store subscriber profile data for a second wireless access network 3, including one or more base stations 28, 32, a controlling entity 24 and a Home Location Register 22. The CSR 36 may also function to control cleaning of the HLR 22 of this second wireless access network 3 in the same way as described above for the first wireless access network 1. Fort example, the same logical connection exists between the CSR 36 and the second HLR 22, as illustrated by the dotted line in FIG. 1.

In one embodiment, the HLR does not need to inform the CSR about the completion of a transaction; the HLR only submits a query to the CSR when it does not already have all the necessary subscriber data, and updates the CSR when necessary. In one embodiment, the HLR is a dataless-type HLR, and it does not permanently store any subscriber information, but submits a query to the CSR for every single transaction. In another embodiment, the HLR is a dataful-type HLR, and it will be apparent to the skilled person what mechanisms would be required to ensure consistency between the CSR and the HLR.

The instruction from the CSR to the HLR to clean a subscriber could be implemented in a number of ways. One example would be a simple command protocol on top of Lightweight Data Access Protocol (LDAP) or Simple Object Access Protocol (SOAP).

With the above-described technique, cleaning of the HLR 4 can be carried out effectively. Where less important data is cleaned more quickly from the HLR 4, extra capacity is released to retain more critical subscriber data at the HLR for a longer time.

Appropriately adapted computer program product may be used for implementing any of the techniques described above. The program code product may be stored on and provided by means of a carrier medium such as a carrier disc, card or tape. Another possibility is to download the program code product via a data network.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method comprising:
   causing obtainment, via a first wireless access technology via a wireless interface of a first type, from a single logical entity, of subscriber information relating to controlling access to a network via the first wireless access technology, wherein said single logical entity provides a source of subscriber information relating to controlling access to a network via each of a plurality of wireless access technologies;
   causing obtainment, via the first wireless access technology via the wireless interface of the first type, from said single logical entity, of subscriber information relating to controlling access to a network via a second wireless access technology via a wireless interface of a second type, wherein the wireless interface of the second type is different than the wireless interface of the first type; and
   causing obtainment, via the first wireless access technology via the wireless interface of the first type, from said single logical entity, of subscriber information relating to controlling access to a network via a third wireless access technology via a wireless interface of a third type, wherein the wireless interface of the third type is different than the wireless interface of the first type and different from the wireless interface of the second type.

2. A method according to claim 1, wherein the single logical entity functions as a Home Location Register.

3. A method according to claim 1, wherein said subscriber information includes authentication, authorisation and accounting information.

4. The method of claim 1, wherein the subscriber information is associated with a user terminal.

5. An apparatus comprising at least one processor and at least one memory storing computer program code, wherein the at least one memory and stored computer program code are configured to, with the at least one processor, cause the apparatus to at least:
   cause obtainment, via a first wireless access technology via a wireless interface of a first type, from a single logical entity, of subscriber information relating to controlling access to the network via the first wireless access technology, wherein said single logical entity provides a source of subscriber information relating to controlling access to a network via each of a plurality of wireless access technologies;
   cause obtainment, via the first wireless access technology via the wireless interface of the first type, from said single logical entity via said first wireless access technology, of subscriber information relating to controlling access to a network via a second wireless access technology via a wireless interface of a second type, wherein the wireless interface of the second type is different than the wireless interface of the first type; and
   cause obtainment, via the first wireless access technology via the wireless interface of the first type, from said single logical entity, of subscriber information relating to controlling access to a network via a third wireless access technology via a wireless interface of a third type, wherein the wireless interface of the third type is different than the wireless interface of the first type and different from the wireless interface of the second type.

6. An apparatus according to claim 5, which is located at a Serving GPRS Support Node (SGSN).

7. An apparatus according to claim 5, wherein the single logical entity comprises a Home Location Register.

8. The apparatus of claim 5, wherein the subscriber information is associated with a user terminal.

9. A computer program product comprising a non-transitory computer-readable medium storing program code, which when loaded onto an apparatus is configured to cause the apparatus to perform a method comprising:
   causing obtainment, via a first wireless access technology via a wireless interface of a first type, from a single logical entity, of subscriber information relating to controlling access to a network via the first wireless access technology, wherein said single logical entity provides a source of subscriber information relating to controlling access to a network via each of a plurality of wireless access technologies;
   causing obtainment, via the first wireless access technology via the wireless interface of the first type, from said single logical entity, of subscriber information relating to controlling access to a network via a second wireless access technology via a wireless interface of a second type, wherein the wireless interface of the second type is different than the wireless interface of the first type; and causing obtainment, via the first wireless access technology via the wireless interface of the first type, from said single logical entity, of subscriber information relating to controlling access to a network via a third wireless access technology via a wireless interface of a third type, wherein the wireless interface of the third type is different than the wireless interface of the first type and different from the wireless interface of the second type.

10. The computer program product of claim 9, wherein the subscriber information is associated with a user terminal.

* * * * *

UNITED STATES PATENT AND TRADEMARK OFFICE
CERTIFICATE OF CORRECTION

| | | Page 1 of 1 |
|---|---|---|
| PATENT NO. | : 8,428,583 B2 | |
| APPLICATION NO. | : 11/642549 | |
| DATED | : April 23, 2013 | |
| INVENTOR(S) | : Ruhanen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,537 days.

Signed and Sealed this
Twentieth Day of October, 2015

Michelle K. Lee
*Director of the United States Patent and Trademark Office*